Patented Apr. 8, 1947

2,418,721

UNITED STATES PATENT OFFICE 2,418,721

RESINOUS REACTION PRODUCT OF ETHYLENE GLYCOL, GLYCEROL, AND SUCCINIC ANHYDRIDE

Carl Opp, Cincinnati, Ohio, assignor to Interchemical Corporation, New York, N. Y., a corporation of Ohio No Drawing. Application July 27, 1943, Serial No. 496,312

4 Claims. (Cl. 260—16)

This invention relates to a coating composition especially designed for use in the protection of metal in gasoline tanks containing high octane gasoline, and specifically relates to a resinous vehicle for such a composition, characterized by its unusually good resistance to such exposure conditions.

A problem has arisen in connection with the manufacture of gasoline tanks for airplanes and the like, in which high octane gasoline is used. The high octane gasoline contains considerable percentages of aromatic ingredients which tend to soften most air-drying coating compositions. Since in actual use these tanks will be contaminated with water and abrasive dirt, it is highly desirable to get a coating which will not be attacked by the gasoline, so that the coating will not be removed by the abrasive, and the metal corroded by the water.

I have discovered that an excellent air drying paint for the interior of gasoline tanks can be made by using as the vehicle for the paint a resin obtained by reacting about 50 parts by weight of succinic anhydride with about 25 parts by weight of glycerine and 25 parts by weight of ethylene glycol to reasonable neutrality (acid number 10 to 30). This resin can be dissolved in any desired solvent for it, such as Cellosolve (monoethyl ether of ethylene glycol), Cellosolve acetate, ethyl acetate, butyl acetate, butanol, methyl isobutyl ketone, etc., to give a varnish which can be pigmented with such corrosion retardant pigments as zinc chromate to produce an excellent lining for gasoline tanks which will stand up well in service.

Typical examples of the invention are the following:

Example 1.—Resin 50.3 parts by weight (1 mol) succinic anhydride
24.7 parts by weight (0.53 mol) glycerine
25.0 parts by weight (0.8 mol) ethylene glycol are charged into a kettle, then heated with agitation while blanketed by $CO_2$ to 205° C. over a period of about 1 hour. The heat is held at about 200° C. until the acid number is between 20 and 30 (about 2½ to 3 hours); at this point, an 80% solution in Cellosolve will have a U-V viscosity on the Gardner viscosity scale. At this point, the resin is cast.

Example 2.—Tank sealing compound

The resin may be made into a tank sealing compound as follows:

| | Parts by weight |
|---|---|
| Zinc chromate | 24.0 |
| Resin of Example 1 | 56.0 |
| Ethyl acetate | 20.0 | are ground in a ball mill for 24 hours.

| | Parts by weight |
|---|---|
| Above paste | 4.3 |
| Resin of Example 1 | 27.3 |
| Ethyl acetate | 57.8 |
| 1000 sec. nitrocellulose | 0.9 |
| Methyl Cellosolve | 9.7 | are mixed to produce the desired product, which is an excellent rust-resisting coating for the interior of tank linings.

The nitrocellulose is used as a bodying agent, in order to get desired body for application. It has little or no effect on the properties of the film. Similar body can be obtained, at considerable increase in expense, by increasing the resin content, or by using other bodying agents—e. g. other high viscosity cellulose derivatives.

If it is desired to produce a harder film resistant to 100 octane gasoline, a blend of the resin and cellulose acetate may be used—e. g.

Example 3.—Acetate lacquer

| | Parts by weight |
|---|---|
| Cellulose acetate | 6.2 |
| Resin of Example 1 | 6.2 |
| Methyl acetone | 37.0 |
| Ethylene dichloride | 37.0 |
| Cellosolve acetate | 13.6 |

This lacquer has unusual resistance to high octane gasoline, and is harder than that obtained with the resin alone. The resin is an excellent plasticizer for the cellulose acetate.

The proportions for making the resin must be rather carefully followed if desirable results are to be obtained. If the parts are varied substantially in any direction, many of the desirable characteristics of the composition are lost; in particular, the use of 45 to 55% succinic acid seems to be essential for the production of the desirable results, while the ratio of glycerol to glycol should not vary greatly from unity. The replacement of the acid by as closely allied an acid as adipic acid, for example, produces a lining which is attacked by high octane gasoline.

Obviously, the specific examples shown may be varied as indicated above, particularly with respect to the pigment and solvent ingredients.

I claim:

1. A resin consisting of the reaction product of about 2 parts by weight of succinic anhydride, 1 part by weight of glycerol, and 1 part by weight of ethylene glycol, having an acid number of 10 to 30, and characterized by its inertness to high octane gasoline, and its plasticizing effect on cellulose acetate.

2. A coating composition suitable for a lining fos gasoline tanks containing high octane gasoline, comprising volatile and non-volatile vehicle components, the non-volatile vehicle of which is not attacked by high octane gasoline and which comprises the reaction product of about 2 parts by weight of succinic anhydride, 1 part by weight of glycerol, and 1 part by weight of ethylene glycol, having an acid number of 10 to 30.

3. A coating composition suitable for a lining for gasoline tanks containing high octane gasoline, comprising volatile and non-volatile vehicle components, the non-volatile vehicle of which consists of the reaction product of about 2 parts by weight of succinic anhydride, 1 part by weight of glycerol, and 1 part by weight of ethylene glycol having an acid number of 10 to 30.

4. A coating composition suitable for a lining for gasoline tanks containing high octane gasoline, comprising volatile and non-volatile vehicle components, the non-volatile vehicle of which consists of the reaction product of about 2 parts by weight of succinic anhydride, 1 part by weight of glycerol, and 1 part by weight of ethylene glycol, having an acid value of 10 to 30, in combination with cellulose acetate.

CARL OPP.

REFERENCES CITED

The following references are of record in the file of this patent:

UNITED STATES PATENTS

| Number | Name | Date |
|---|---|---|
| 1,847,783 | Pieper | Mar. 1, 1932 |

FOREIGN PATENTS

| Number | Country | Date |
|---|---|---|
| 317,797 | British | Dec. 22, 1930 |
| 322,540 | British | Dec. 2, 1929 |